US007715181B2

(12) United States Patent
Raz

(10) Patent No.: US 7,715,181 B2
(45) Date of Patent: May 11, 2010

(54) ADAPTER CONFIGURED TO COUPLE ELECTRICAL COMPONENT TO SLOT IN HOST DEVICE

(75) Inventor: Guy Raz, Westlake Village, CA (US)

(73) Assignee: Belkin International, Inc., Playa Vista, CA (US)

( * ) Notice: Subject to any disclaimer, the term of this patent is extended or adjusted under 35 U.S.C. 154(b) by 182 days.

(21) Appl. No.: 11/904,759

(22) Filed: Sep. 28, 2007

(65) Prior Publication Data

US 2009/0088004 A1   Apr. 2, 2009

(51) Int. Cl.
 *G06F 1/16* (2006.01)
 *H05K 7/10* (2006.01)
 *G11B 5/012* (2006.01)

(52) U.S. Cl. .......................... 361/679.31; 361/679.32; 710/301; 360/97.01

(58) Field of Classification Search ................ 361/679.01–679.45, 679.55–679.59, 724–727; 360/97.01; 710/301
See application file for complete search history.

(56) References Cited

U.S. PATENT DOCUMENTS

| D427,167 S | 6/2000 | Iwasaki |
| 6,104,617 A | 8/2000 | Schremmer |
| D450,708 S | 11/2001 | Hsu |
| D478,087 S | 8/2003 | Aldridge |
| D491,191 S | 6/2004 | Wen et al. |
| 7,059,913 B1 | 6/2006 | Chen |
| D533,505 S | 12/2006 | Chen |
| 7,234,972 B1 | 6/2007 | Lai |
| D576,626 S | 9/2008 | On et al. |
| D580,442 S | 11/2008 | Kim et al. |
| 2008/0059681 A1 | 3/2008 | Lodolo et al. |
| 2009/0004921 A1 | 1/2009 | Hubert et al. |
| 2009/0006698 A1* | 1/2009 | Hubert et al. ............... 710/301 |

OTHER PUBLICATIONS

Targus ExpressCard™ Notebook Docking Station with Digital Video and Audio; http://www.targus.com/us/CategorySearch.asp?brand=Targus+SearchedTerms=expresscard; May 31, 2007; 2 pages.
ExpressCard; http://en.wikipedia.org/wiki/Expresscard; Jul. 3, 2007; 3 pages.

(Continued)

*Primary Examiner*—Jayprakash N Gandhi
*Assistant Examiner*—Nidhi Desai
(74) *Attorney, Agent, or Firm*—Bryan Cave LLP

(57) ABSTRACT

In some embodiments, an adapter is configured to couple an electrical component to a slot in a host device. The electrical component can have at least three sides. The adapter including: (a) a first housing piece configured to be coupled to two or more sides of the at least three sides of the electrical component when the adapter is coupled to the electrical component; and (b) a second housing piece coupled to the first housing piece and configured to couple to a first side of the at least three sides of the electrical component. When the adapter is coupled to the electrical component, a portion of the second housing piece can be configured to be located inside the slot in the host device along with the electrical component. When the adapter is coupled to the electrical component and the portion of the second housing piece is located inside the slot in the host device, the first housing piece can be located outside of the slot. Other embodiments are disclosed in this application.

26 Claims, 10 Drawing Sheets

OTHER PUBLICATIONS

ExpressCard Frequently Asked Questions; http://www.expresscard.org/web/site/qa.jsp; Jul. 3, 2007; 10 pages.
About ExpressCard® Technology; http://www.expresscard.org/web/site/about.jsp; Jul. 3, 2007; 6 pages.
ExpressCard™ Notebook Docking Station with Digital Video and Audio; 2007; 23 pages.
European Search Report; Application No. 08253150.0-1248/2043029; dated Nov. 2, 2009.

* cited by examiner

ADAPTER CONFIGURED TO COUPLE ELECTRICAL COMPONENT TO SLOT IN HOST DEVICE

FIELD OF THE INVENTION

This invention relates generally to adapters for electrical devices, and relates more particularly to adapters that couple electrical components to slots in host devices and methods of using the same.

DESCRIPTION OF THE BACKGROUND

The ExpressCard standard provides a method and standard interface for creating a direct connection between an electrical component and a system bus in a computer. The ExpressCard standard provides for electrical components with two widths: 54 millimeter and 34 millimeters. Both the 34 millimeter ExpressCards and 54 millimeter ExpressCards use the same type of connector to couple to the system bus. That is, both the 34 millimeter and 54 millimeter ExpressCards each have 26-pin beam-on-blade connectors. Accordingly, 34 millimeter ExpressCards can be plugged into 54 millimeter ExpressCard slots.

Many computer manufacturers provide only 54 millimeter ExpressCard slots in their computers because users can plug either size of ExpressCard into the 54 millimeter ExpressCard slots. However, when a user places a 34 millimeter ExpressCard inside of a 54 millimeter ExpressCard slot, the 34 millimeter ExpressCard can wobble and can easily become dislodged from the 54 millimeter ExpressCard slot. A gap also exists in the slot because the 34 millimeter ExpressCard is smaller than the slot. Foreign particles or other items can enter the computer case through this gap and potentially damage the ExpressCard or the computer.

Accordingly, a need exists for an adapter for the 34 millimeter ExpressCard that helps secure the 34 millimeter ExpressCard to the 54 millimeter ExpressCard slot and that prevents foreign particles or other items from entering the slot when the 34 millimeter ExpressCard is inside the 54 millimeter ExpressCard slot.

BRIEF DESCRIPTION OF THE DRAWINGS

To facilitate further description of the embodiments, the following drawings are provided in which.

Figure 1:
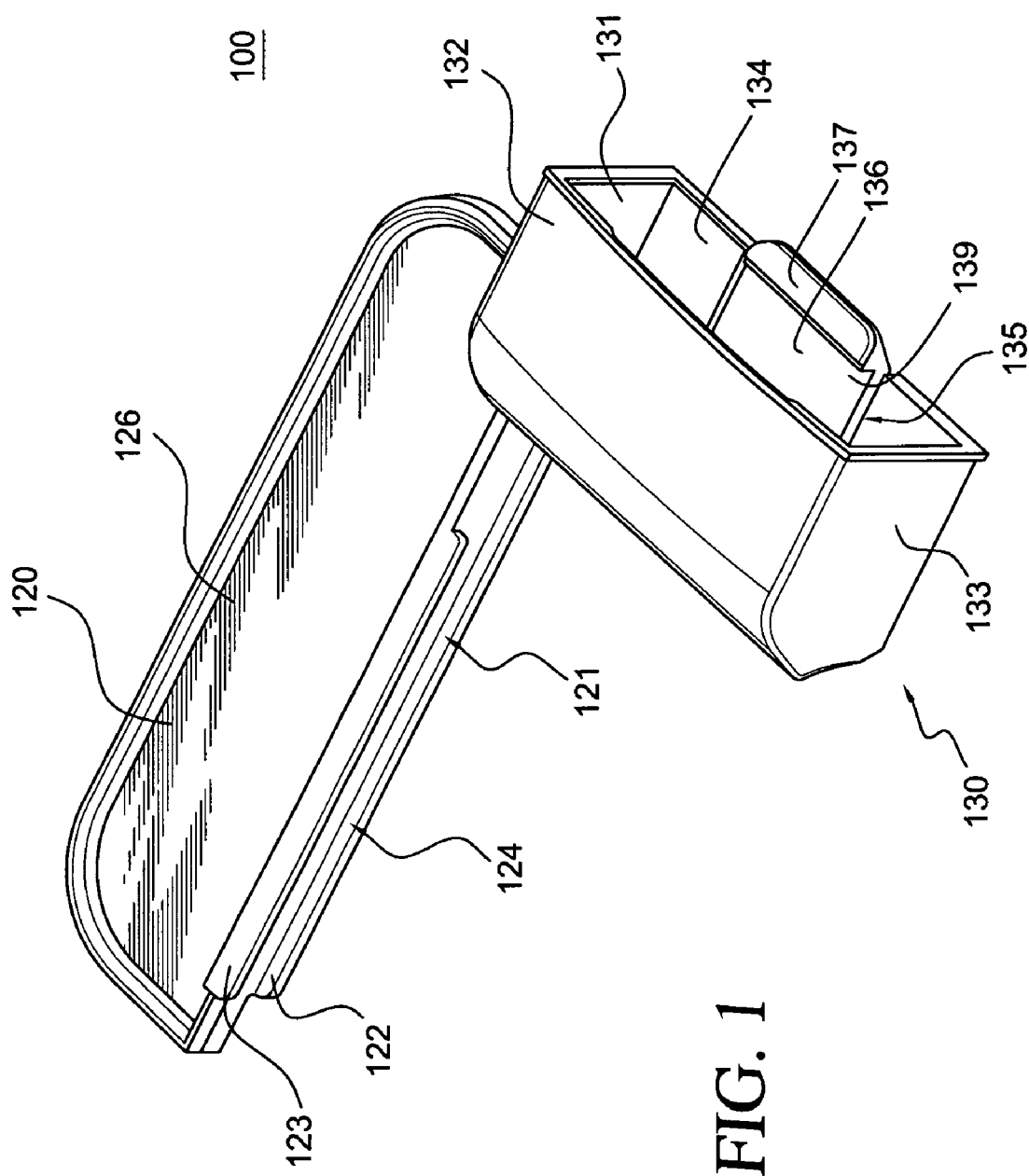
FIG. 1 illustrates a top, left, front isometric view of an adapter, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," and "have," and any variations thereof, are intended to cover a non-exclusive inclusion, such that a process, method, system, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "on," as used herein, is defined as on, at, or otherwise adjacent to or next to or over.

The terms "couple," "coupled," "couples," "coupling," and the like should be broadly understood and refer to connecting two or more elements or signals, electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable. For example, the recitation of a first portion being coupled to a second portion does not mean that the first portion cannot be removed (readily or otherwise) from, or that it is permanently connected to, the second portion.

DETAILED DESCRIPTION OF EXAMPLES OF EMBODIMENTS

In a number of embodiments, an adapter is configured to couple an electrical component to a slot in a host device. The electrical component has at least three sides. The adapter includes: (a) a first housing piece configured to be coupled to two or more sides of the at least three sides of the electrical component when the adapter is coupled to the electrical component; and (b) a second housing piece coupled to the first housing piece and configured to couple to a first side of the at least three sides of the electrical component when the adaptor is coupled to the electrical component. In these embodiments, when the adapter is coupled to the electrical component and a portion of the electrical component is located inside the slot in the host device, a portion of the second housing piece can be configured to be located inside the slot in the host device along with the electrical component. Furthermore, when the adapter is coupled to the electrical component and the portion of the second housing piece is located inside the slot in the host device, the first housing piece can be located outside of the slot.

The same or different embodiments disclose an extender for a 34 millimeter ExpressCard and for use in a 54 millimeter ExpressCard slot. In these embodiments, the 34 millimeter ExpressCard has two or more sides, and a first side of the two or more sides of the 34 millimeter ExpressCard includes an attachment mechanism. The extender includes: (a) an insertion portion having a first attachment mechanism; and (b) a holding portion having at least two sides and coupled to the insertion portion. The insertion portion can be configured such that a part of the insertion portion is located in the 54 millimeter ExpressCard slot along with the 34 millimeter ExpressCard when the extender is coupled to the 34 millimeter ExpressCard. The first attachment mechanism of the insertion portion can be configured to couple to the attachment mechanism of the 34 millimeter ExpressCard. The holding portion can be configured to be external to the 54 millimeter ExpressCard slot when the extender is coupled to the 34 millimeter ExpressCard and when the at least the part of the insertion portion and the 34 millimeter ExpressCard are located in the 54 millimeter ExpressCard slot. A first side of the at least two sides of the holding portion can be configured to adjoin the first side of the two or more sides of the 34 millimeter ExpressCard when the extender is coupled to the 34 millimeter ExpressCard. A second side of the at least two sides of the holding portion can be configured to adjoin a second side of the two or more sides of the 34 millimeter ExpressCard when the extender is coupled to the 34 millimeter ExpressCard.

Yet another embodiment discloses a method of coupling an electrical component to a slot in a host device. The electrical component has at least three sides. The method includes: (a) providing an adapter having: (1) a first housing piece; and (2) a second housing piece; (b) coupling the adapter to the electrical component such that the first housing piece is adjacent to two or more sides of the at least three sides of the electrical component and the second housing piece is adjacent to a first side of the at least three sides of the electrical component; and (c) inserting the electrical component and a portion of the second housing piece inside the slot in the host device while the first housing piece is exterior to the slot in the host device.

Figure 2:
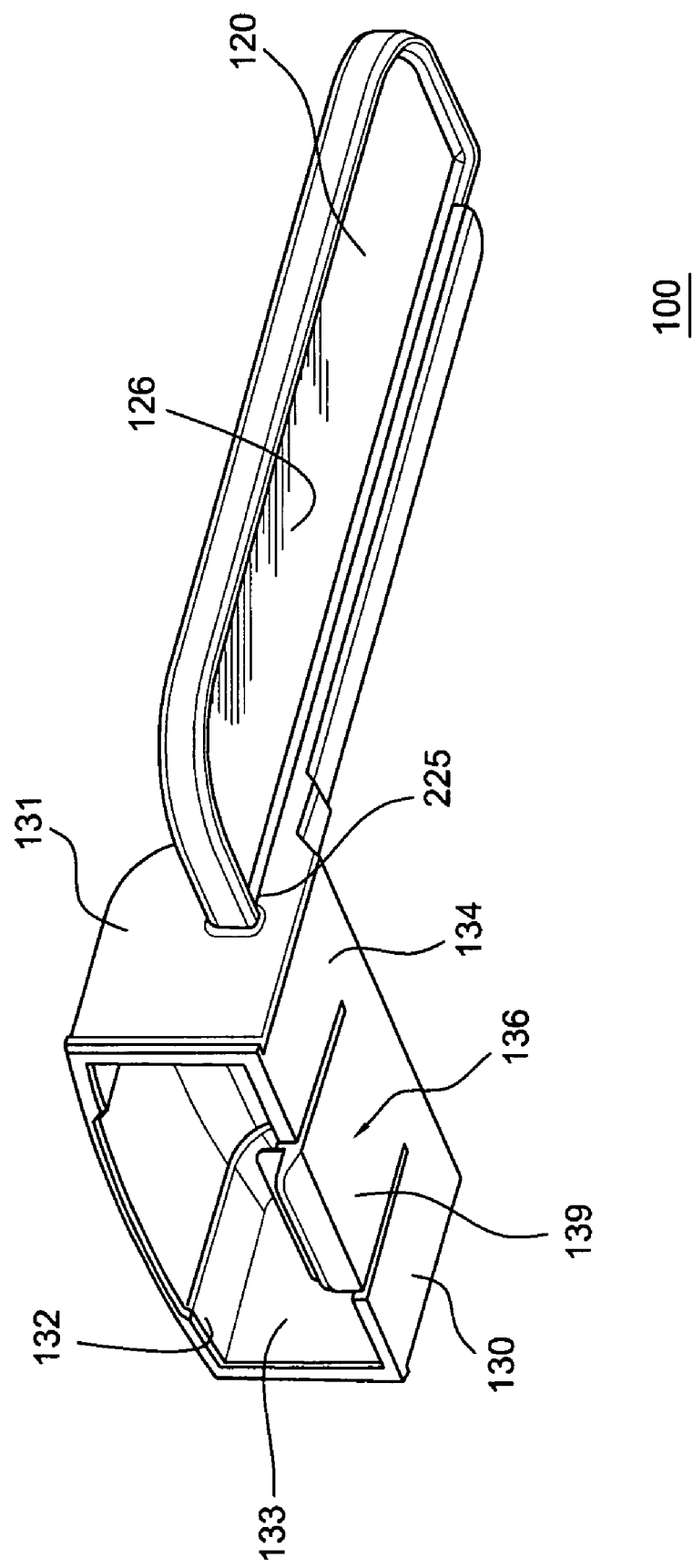
FIG. 2 illustrates a bottom, right, front isometric view of the adapter of FIG. 1, according to the first embodiment.

Turning to the drawings, FIG. 1 illustrates a top, left, front isometric view of an adapter 100, according to a first embodiment. FIG. 2 illustrates a bottom, right, front isometric view of adapter 100, according to the first embodiment. Adapter 100 is merely exemplary and is not limited to the embodiments presented herein. Adapter 100 can be employed in many different embodiments or examples not specifically depicted or described herein.

Referring to FIGS. 1 and 2, an extender or adapter 100 can include: (a) a housing piece or an insertion portion 120; (b) a housing piece or holding portion 130 coupled to insertion portion 120. Insertion portion 120 is coupled to holding portion at a region 225 (FIG. 2). In the illustrated embodiment, adapter 100 has a unitary structure. In non-illustrated embodiments, holding portion 130 is configured to be detachable from insertion portion 120. In some embodiments, holding portion 130 can be detachable from insertion portion 120 at region 225. In other embodiments, a first portion of adapter 100 can be detached from a second portion of adapter 100 at a region other than region 225.

Insertion portion 120 can include: (a) a body portion 126; and (b) an attachment mechanism 121. In one example, attachment mechanism 121 can include a groove 124 formed by ridges 122 and 123. In one example, body portion 126 is approximately 67.5 millimeters (mm) long and 20 mm wide.

Holding portion 130 can include: (a) a side 131; (b) a side 132 adjacent to side 131; (c) a side 133 spaced apart from side 131 and adjacent to side 132; (d) a side 134 spaced apart from side 132 and adjacent to sides 131 and 132. Sides 131, 132, 133, and 134 form a channel 135. In one example, holding portion 130 has a height of approximately 12.3 mm and a width of approximately 34.2 mm.

In some examples, holding portion 130 can further include a coupling or attachment mechanism 136. In many embodiments, attachment mechanism 136 can include a finger 139 at side 134 that can be depressed using a handle 137.

Figure 3:
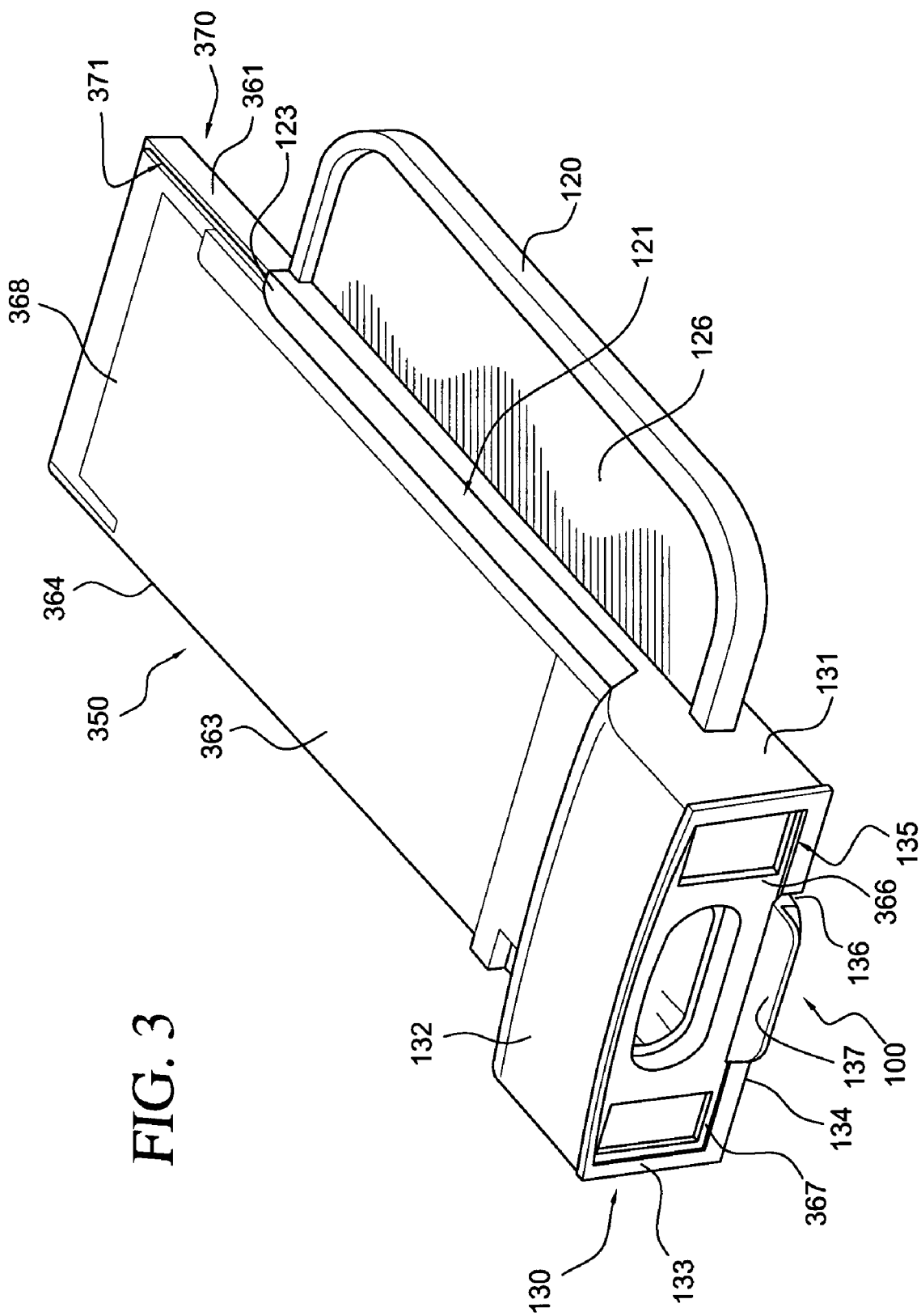
FIG. 3 illustrates a top, right, front isometric view of the adapter of FIG. 1 coupled to an electrical component, according to the first embodiment.
Figure 4:
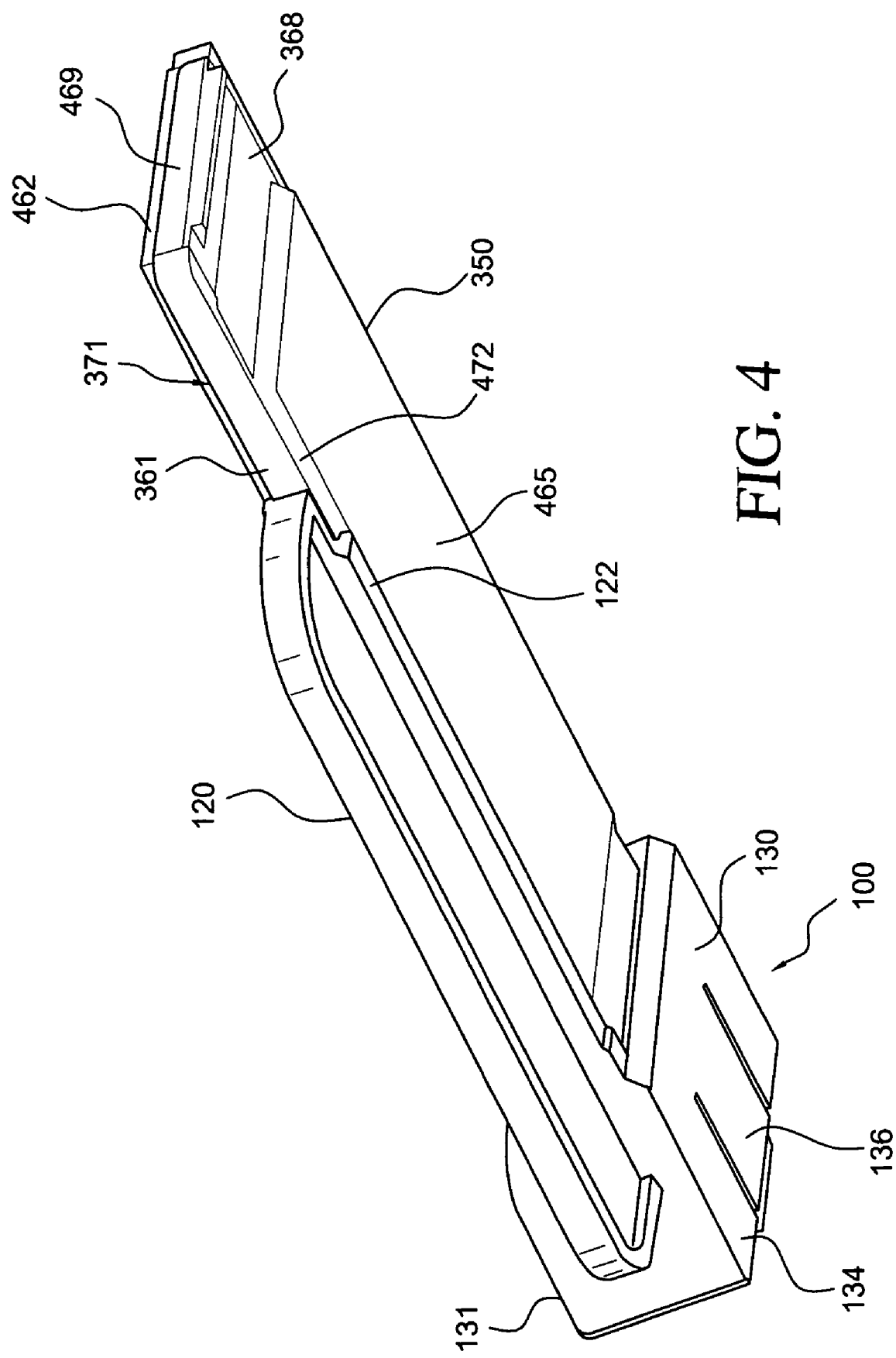
FIG. 4 illustrates a bottom, right, back isometric view of the adapter of FIG. 1 coupled to the electrical component of FIG. 3, according to the first embodiment.

FIG. 3 illustrates a top, right, front isometric view of adapter 100 coupled to an electrical component 350, according to the first embodiment. FIG. 4 illustrates a bottom, right, back isometric view of adapter 100 coupled to electrical component 350, according to the first embodiment.

In some embodiments, adapter 100 is configured and designed to couple to electrical component 350. Referring to FIGS. 3 and 4, electrical component 350 can include: (a) a side 361; (b) a side 462 (FIG. 4) adjacent to side 361 and having a data connector 469 (FIG. 4); (c) a side 363 adjacent to side 462 and opposite side 361; (d) a side 364 adjacent to sides 361, 462, and 363; (e) a side 465 (FIG. 4) opposite side 364 and adjacent to sides 361, 462, and 363; and (f) a side 366 opposite side 462 and adjacent to sides 361, 363, 364, and 465. In the same or different example, electrical component 350 can be considered to include a rear housing portion 367 and a front housing portion 368.

In various embodiments, electrical component 350 can further include one or more coupling or attachment mechanisms 370. In various examples, attachment mechanisms 370 can include grooves or channels 371 and 472 (FIG. 4). Channels 371 and 472 can be located at and protrude from sides 361 and 363, respectively.

Holding portion 130 can be configured to couple to rear housing portion 367. That is, holding portion 130 can be configured to circumscribe or fit around at least a portion of electrical component 350. Holding portion 130 can be sized and shaped such that rear housing portion 367 can be placed inside of channel 135.

In this embodiment, holding portion 130 can be configured to be adjacent to four sides of electrical component 350 when adapter 100 is coupled to electrical component 350. That is, when adapter 100 is coupled to electrical component 350, holding portion 130 is configured such that: (a) side 131 is adjacent to side 361; (b) side 132 is adjacent to side 364; (c) side 133 is adjacent to side 363; and (d) side 134 is adjacent to side 465. In some embodiments, the size and the shape of holding portion 130 conforms to the size and shape of rear housing portion 367.

In the same or different embodiments, insertion portion 120 is configured to couple at least to front housing portion 368. In some examples, insertion portion 120 can coupled to side 361 of electrical component 350.

In some examples, attachment mechanism 121 is configured to couple to the attachment mechanisms 370. That is, attachment mechanism 121 can be configured to couple to channel 371 and/or channel 472. For example, when adapter 100 is coupled to electrical component 350, ridges 122 and 123 can be located in and/or attach to channels 371 or 472 to help securely couple insertion portion 120 to side 361.

In some examples, attachment mechanism 136 can be configured to couple to side 465 of electrical component 350. For example, attachment mechanism 136 can hold rear housing portion 367 or another portion of electrical component 350 in channel 135. A user can release electrical component 350 from adapter 100 by depressing handle 137.

In the same or different examples, electrical component 350 can include other or additional attachments mechanisms. For example, electrical component 350 could include a hook (not shown) capable of coupling to a snap (not shown) on adapter 100.

Figure 5:
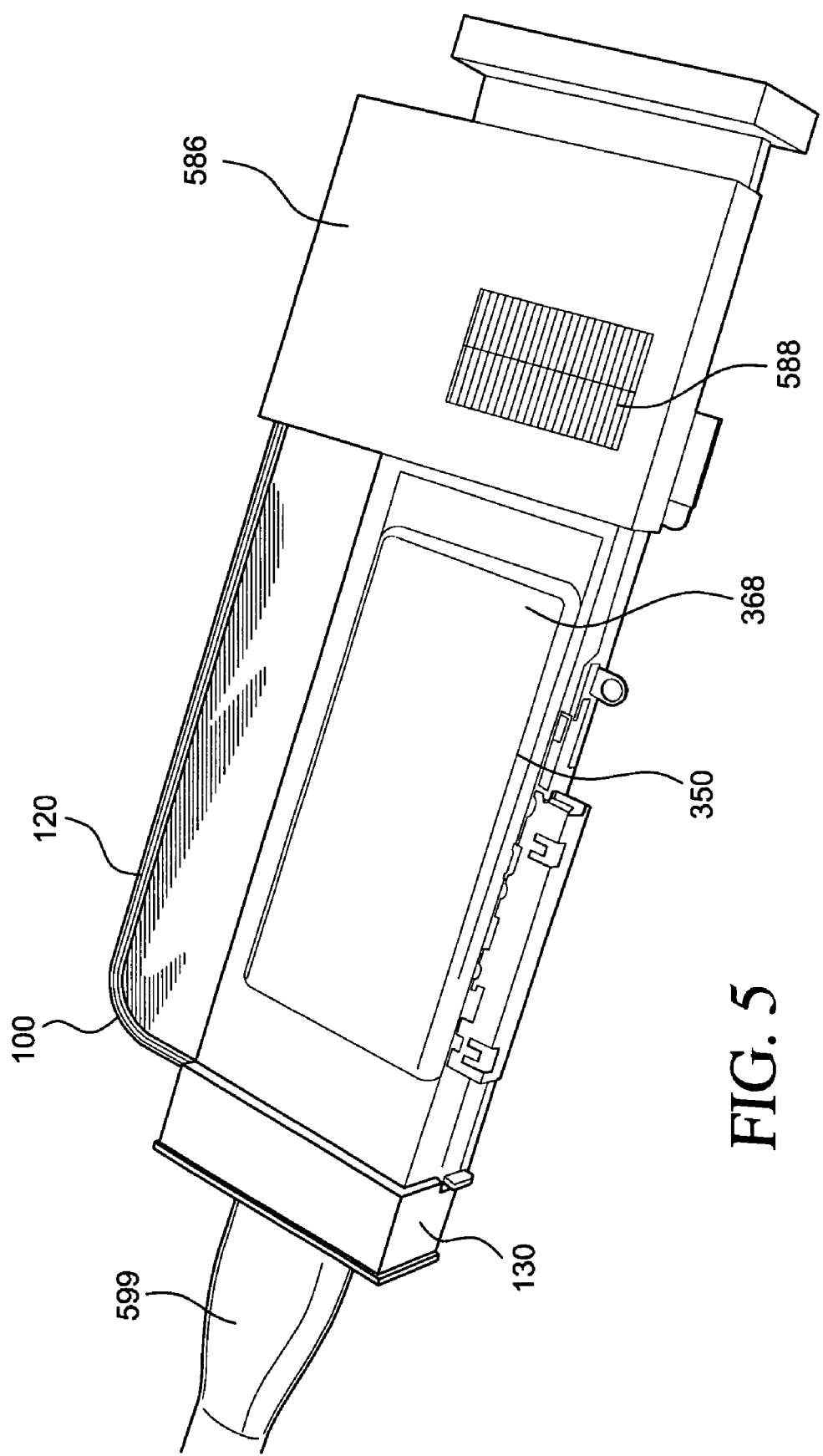
FIG. 5 illustrates a right, top isometric view of the adapter of FIG. 1 and the electrical component of FIG. 3 coupled to a receiving component, according to the first embodiment.
Figure 6:
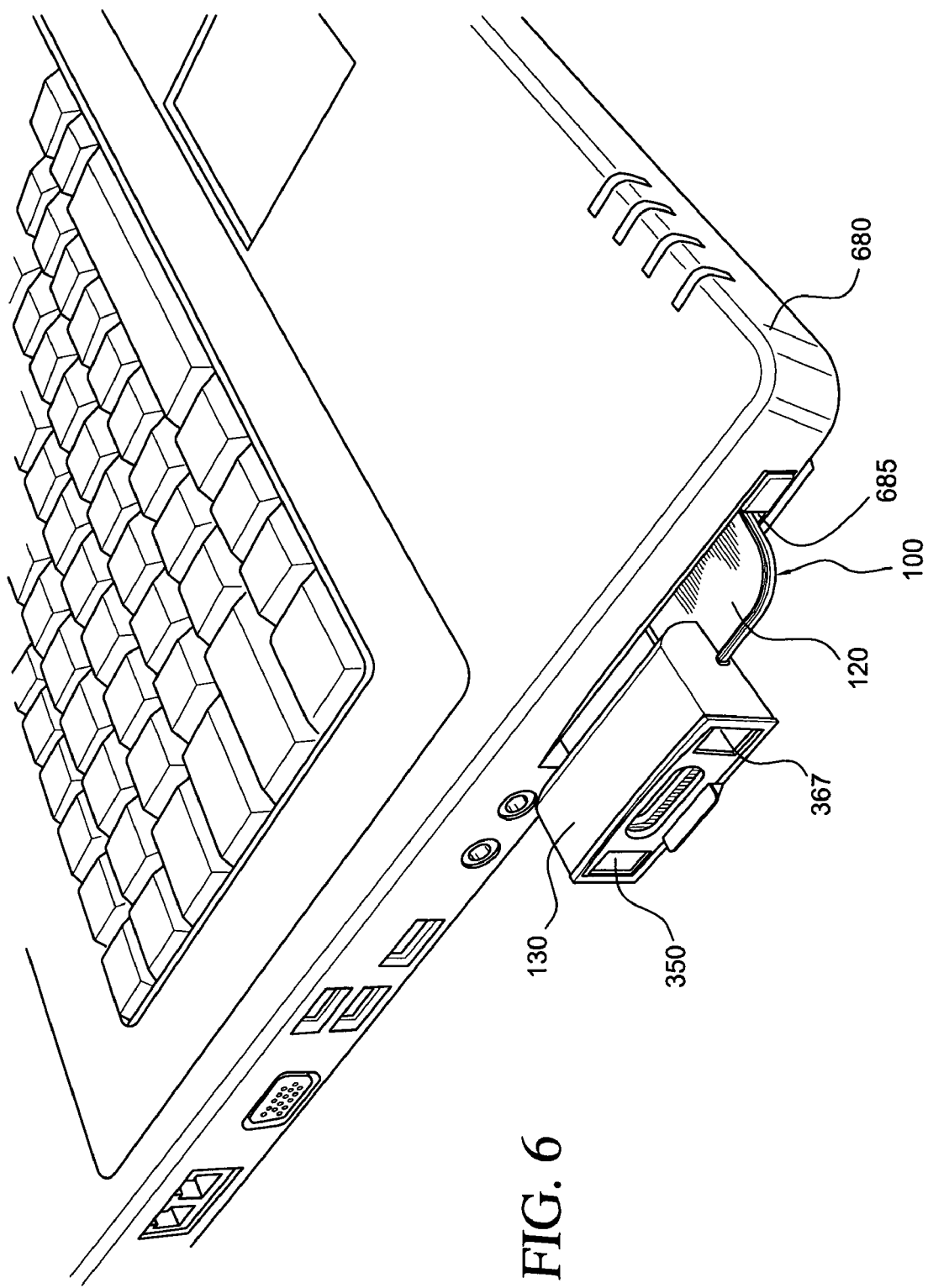
FIG. 6 illustrates a right, front, top isometric view of the adapter of FIG. 1 and the electrical component of FIG. 3 inside of a slot in a host device, according to the first embodiment.

FIG. 5 illustrates a right, top isometric view of adapter 100 and electrical component 350 coupled to a receiving component 586, according to the first embodiment. FIG. 6 illustrates a right, front, top isometric view of adapter 100 and electrical component 350 inside of a slot 685 in a host device 680.

In some embodiments, receiving component 586 can be a part of host device 680 (FIG. 6) and located adjacent to and/or within slot 685 (FIG. 6). In these embodiments, when electrical component 350 is inside of slot 685, electrical component 350 is also coupled to receiving component 586. Front housing portion 368 is capable of being placed into slot 685 while rear housing portion 367 is outside of slot 685. Data connector 469 (FIG. 4) can be configured to couple to an electrical connector of receiving component 586.

As shown in FIGS. 5 and 6, adapter 100 can be configured to couple to electrical component 350 and help securely couple electrical component 350 to receiving component 586. In the same or different embodiments, adapter 100 can be configured to help securely place electrical component 350 in slot 685 in host device 680.

In some embodiments, at least a portion of insertion portion 120 can be configured to be placed into slot 685 along with electrical component 350 when adapter 100 is coupled to electrical component 350. In some examples, insertion portion 120 can be inserted into slot 685 if the slot is an L-shaped 54 millimeter ExpressCard slot. In some embodiments, only a part of insertion portion 120 is placed inside slot 685 with electrical component 350. In other embodiments, all of insertion portion 120 is placed inside of slot 685.

Holding portion 130 can be configured to be substantially external to slot 685 when adapter 100 is coupled to electrical component 350 and electrical component 350 and at least a part of insertion portion 120 is placed into slot 685.

In the embodiment shown in FIG. 5, electrical component 350 is coupled to a cable 599. One of the benefits of adapter 100 is that adapter 100 securely couples to electrical component 350 while allowing unobstructed coupling of secondary electrical components, connectors, adapters, and cables to rear housing portion 367.

In many examples, electrical component is a 34 millimeter ExpressCard. In other examples, electrical component 350 can be a 54 millimeter ExpressCard, a PCMCIA (Personal Computer Memory Card International Association) card, a CardBus card, a CompactFlash card, a MiniCard, a SmartMedia card, a MemoryStick card, or the like.

Adapter 100 is preferably made of a material that is tough, hard, and rigid, has good chemical and heat resistance and dimensional stability, exhibits good creep resistance, and is relatively strong and inexpensive. Accordingly, adapter 100 can be constructed of acrylonitrile butadiene styrene (ABS), polycarbonate, polypropylene, polyethylene, or a similar material, all of which, to varying degrees, exhibit the stated properties. In one embodiment, adapter 100 is made using an injection molding process.

In alternative embodiments, different materials can be used to form holding portion 130 and insertion portion 120. For example, insertion portion 120 can be made of a first plastic and holding portion 130 can be made of a second more flexible material (e.g. rubber, metal, or a different plastic).

Figure 7:
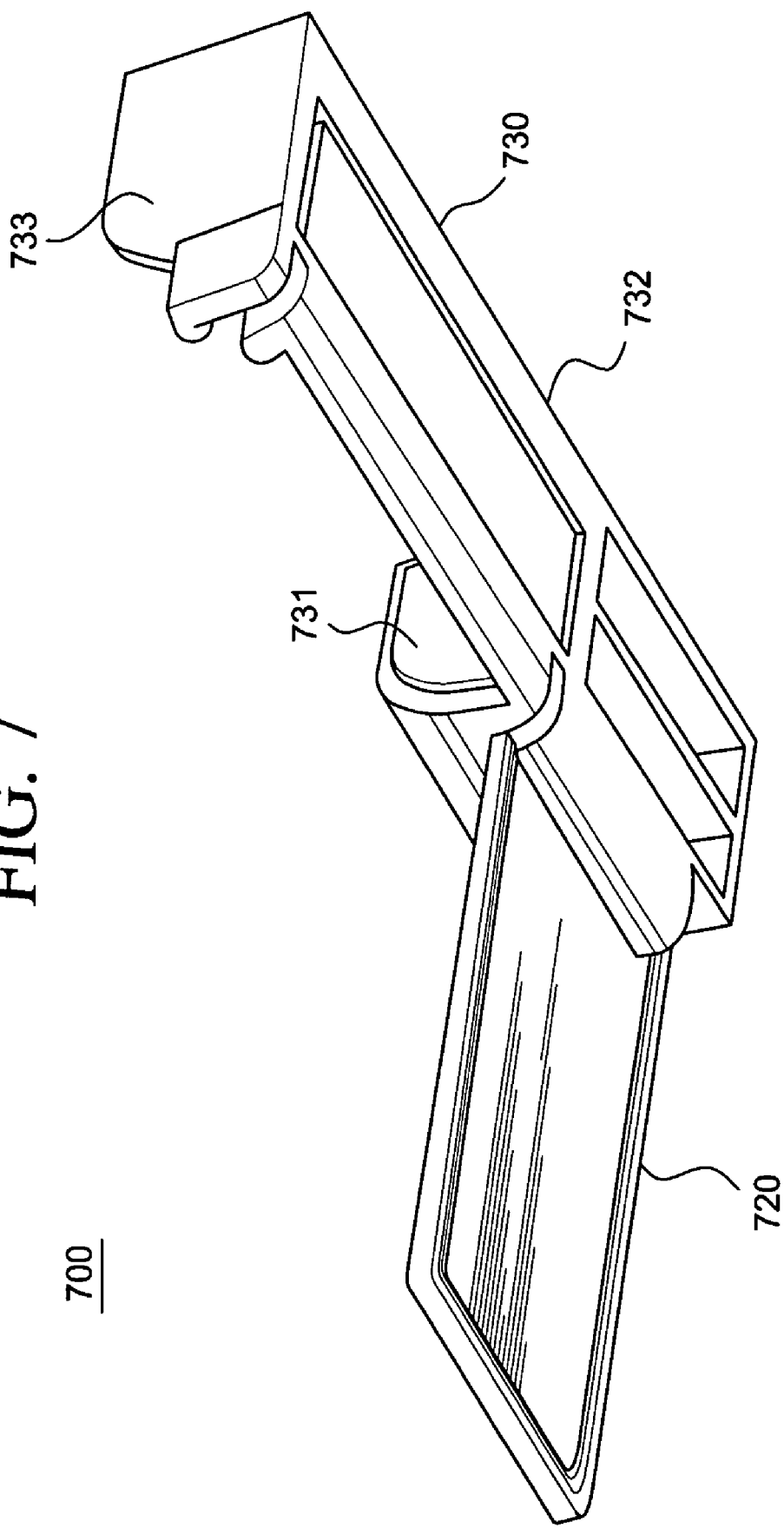
FIG. 7 illustrates a bottom, left, back isometric view of an adapter, according to a second embodiment.
Figure 8:
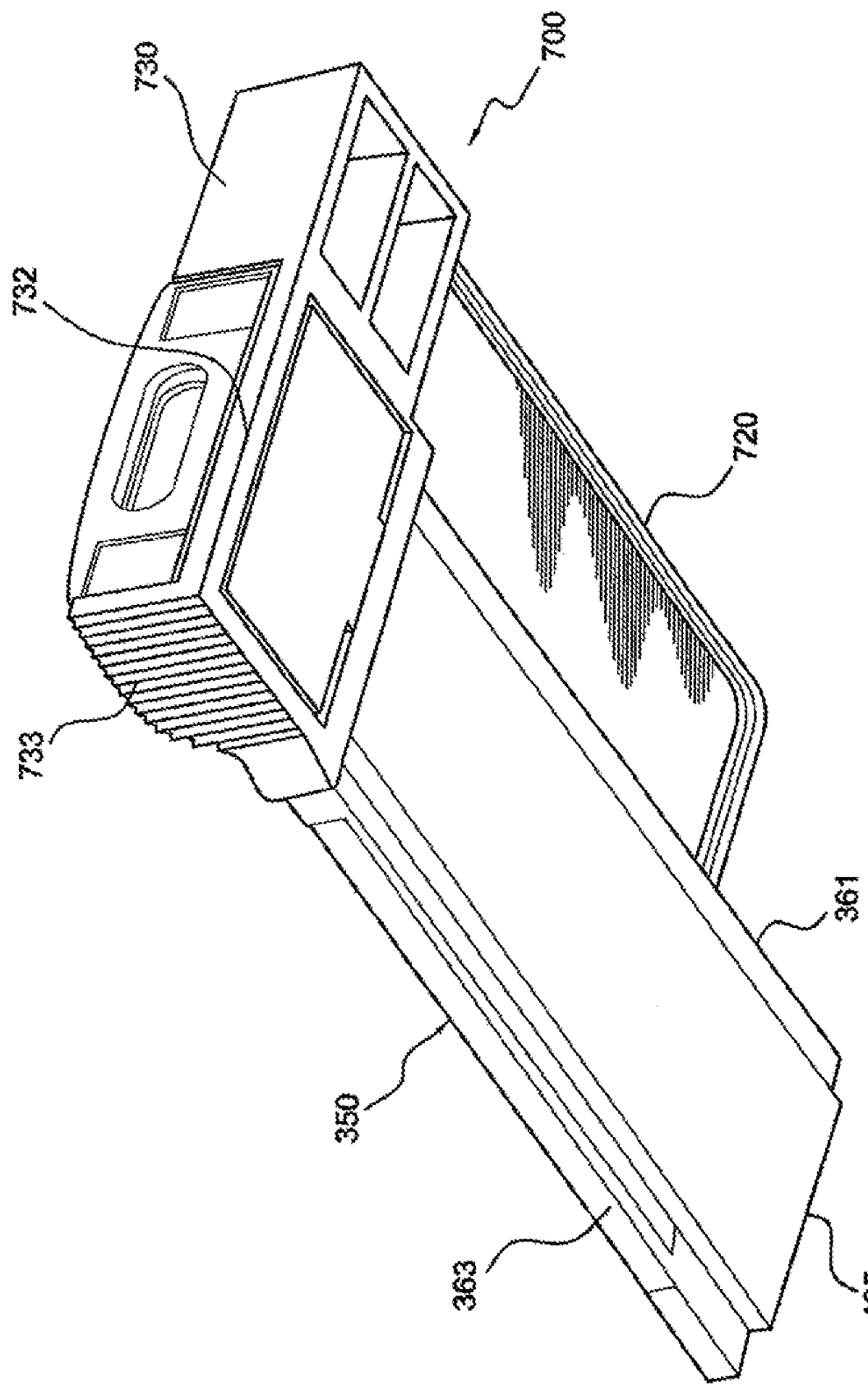
FIG. 8 illustrates a bottom, left, front isometric view of the adapter of FIG. 7 coupled to an electrical component, according to the second embodiment.

Turning to another embodiment, FIG. 7 illustrates a bottom, left, back isometric view of an adapter 700, according to a second embodiment. FIG. 8 illustrates a bottom, left, front isometric view of adapter 700 coupled to electrical component 350, according to the second embodiment.

Referring to FIGS. 7 and 8, adapter 700 can include: (a) an insertion portion 720; (b) a holding portion 730 coupled to insertion portion 720. Similar to adapter 100 (FIG. 1), adapter 700 can be configured to couple to electrical component 350 and help securely couple electrical component 350 to receiving component 586 (FIG. 5) in host device 680 (FIG. 6).

In this embodiment, holding portion 730 includes: (a) a side 731; and (b) a side 732 adjacent to side 731; and (c) a side 733 spaced apart from side 731 and adjacent to side 732. As illustrated in FIG. 8, when adapter 700 is coupled to electrical component 350, holding portion 730 is configured such that: (a) side 731 is adjacent to side 361; (b) side 732 is adjacent to side 465; and (c) side 733 is adjacent to side 363.

In some embodiments, at least a portion of insertion portion 720 can be configured to be placed into slot 685 (FIG. 6) along with electrical component 350 when adapter 700 is coupled to electrical component 350. Holding portion 730 can be configured to be substantially external to slot 685 (FIG. 6) when adapter 700 is coupled to electrical component 350 and when electrical component 350 and at least a part of insertion portion 720 are placed into slot 685 (FIG. 6).

Figure 10:
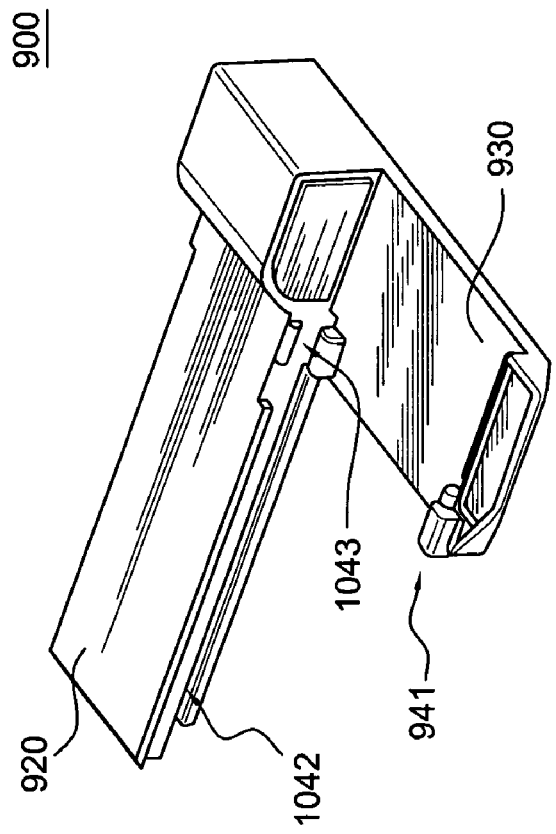
FIG. 10 illustrates a top, left, front isometric view of the adapter of FIG. 9, according to the third embodiment.
Figure 9:
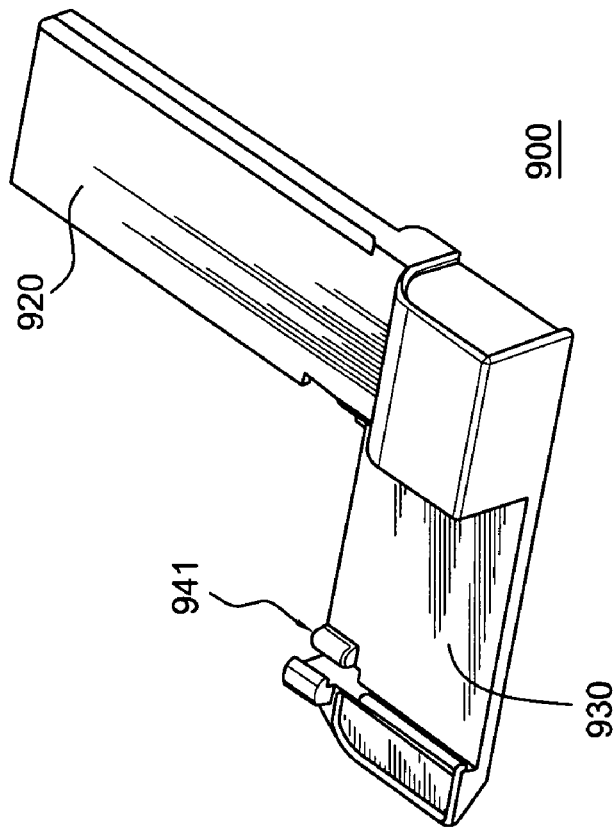
FIG. 9 illustrates a top, right, front isometric view of an adapter, according to a third embodiment.

Turning to a further embodiment, FIG. 9 illustrates a top, right, front isometric view of an adapter 900, according to a third embodiment. FIG. 10 illustrates a top, left, front isometric view of adapter 900, according to the third embodiment.

As illustrated in FIGS. 9 and 10, adapter 900 can include (a) an insertion portion 920; (b) a holding portion 930 coupled to insertion portion 920; and (c) coupling mechanisms 941, 1042, and 1043. Similar to adapters 100 and 700 (FIGS. 1 and 7, respectively), adapter 900 can be configured to couple to electrical component 350 (FIG. 3) and help securely couple electrical component 350 to receiving component 586 (FIG. 5) in host device 680 (FIG. 6).

Holding portion 730 can be configured to be adjacent to sides 361, 363, and 465 (FIGS. 3 and 4) of electrical component 350 when adapter 700 is coupled to electrical component 350 (FIG. 3).

Coupling mechanisms 941, 1042, and 1043 can be used to hold adapter 900 to electrical component 350 (FIG. 3). In some examples, coupling mechanism 1042 can be similar to attachment mechanism 121. Coupling mechanisms 941 and 1043 can attach to complementary coupling mechanisms on the electrical component. In some examples, coupling mechanisms 941 and 1043 can be snaps that attach to complementary snaps on electrical component 350 (FIG. 3). Coupling mechanism 941 and 1043 can couple to opposite sides of electrical component 350 (FIG. 3).

In some embodiments, at least a portion of insertion portion 920 can be configured to be placed into slot 685 (FIG. 6) along with electrical component 350 (FIG. 3) when adapter 900 is coupled to electrical component 350 (FIG. 3). Holding portion 930 can be configured to be substantially external to slot 685 (FIG. 6) when adapter 900 is coupled to electrical component 350 (FIG. 3) and when electrical component 350 (FIG. 3) and at least a part of insertion portion 920 are placed into slot 685 (FIG. 6).

Figure 11:
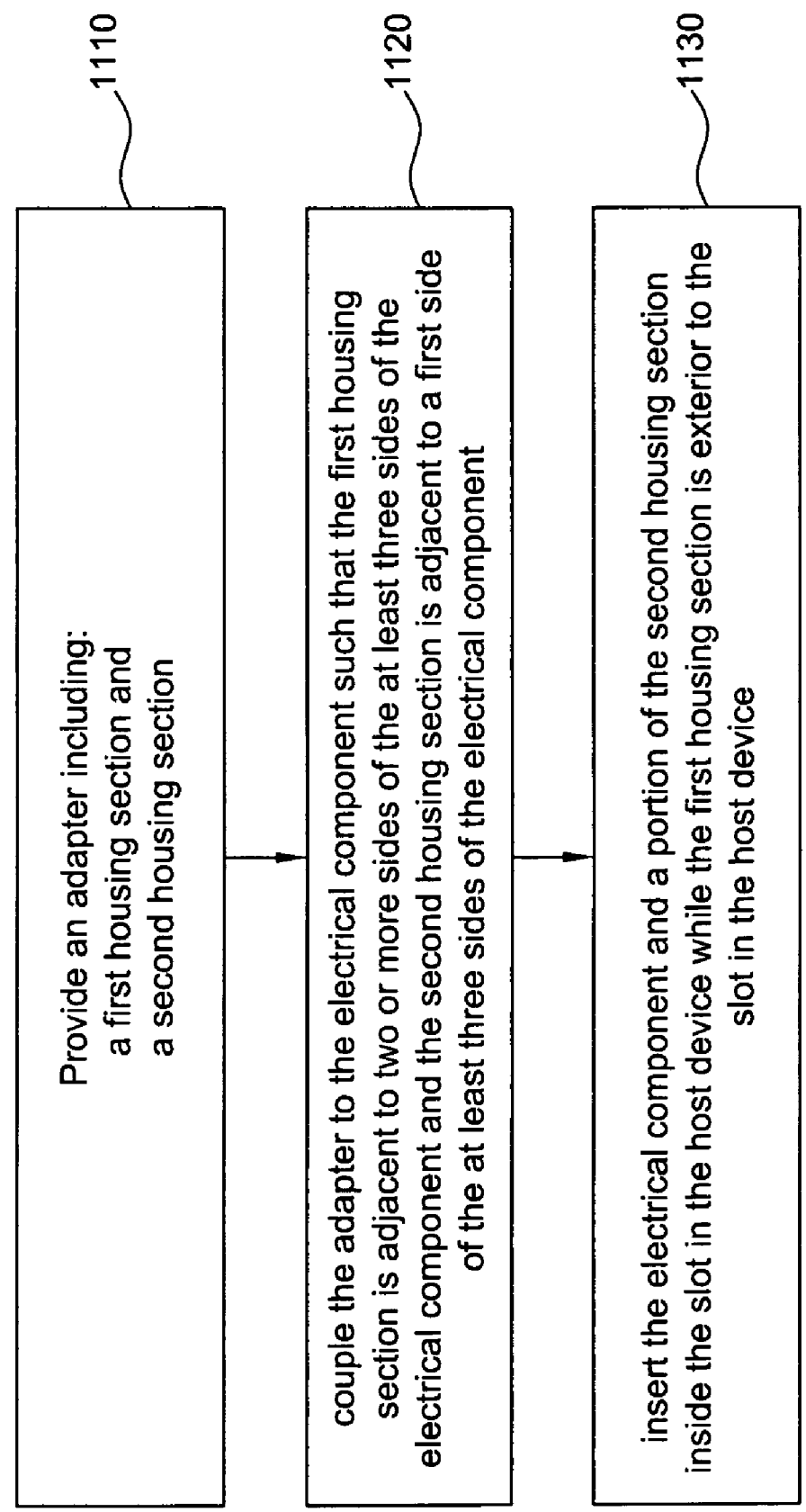
FIG. 11 illustrates a flow chart for an embodiment of a method of coupling an electrical component to a connector in a host device.

FIG. 11 illustrates a flow chart 1100 for an embodiment of a method of coupling an electrical component to a slot in a host device. As an example, the electrical device can be identical or similar to electrical component 350 of FIGS. 3 and 8. The host device can be identical or similar to host device 680 of FIG. 6. The slot can be identical or similar to slot 685 of FIG. 6.

Flow chart 1100 includes a step 1110 of providing an adapter including: (a) a first housing section; and (b) a second housing section. As an example, the adapter can be similar or identical to adapters 100, 700, or 900 of FIGS. 1, 7, and 9, respectively. The first housing section can be identical or similar to holding portions 130, 730, or 930 of FIGS. 1, 7, and 9, respectively. The second housing section can be similar or identical to insertion portions 120, 720, or 920 of FIGS. 1, 7, and 9, respectively.

Flow chart 1100 in FIG. 11 continues with a step 1120 of coupling the adapter to the electrical component such that the first housing section is adjacent to two or more sides of the at least three sides of the electrical component and the second housing section is adjacent to a first side of the at least three sides of the electrical component. As an example, the adapter can be coupled to the electrical component similar or identical to the coupling of adapters 100 and 700 and electrical component 350 as shown in FIGS. 3 and 8, respectively, and as described with reference to FIGS. 9 and 10.

In some examples, the first side of the at least three sides of the electrical component is one of the two or more sides of the at least three sides of the electrical component. In alternative embodiments, the first side of the at least three sides of the electrical component is different from the two or more sides of the at least three sides of the electrical component.

Subsequently, flow chart 1100 in FIG. 11 includes a step 1130 of inserting the electrical component and a portion of the second housing section inside the slot in the host while the first housing section is exterior to the slot in the host device. The insertion of the electrical component and the adapter inside the slot can be similar or identical to electrical component 350 and adapter 100 inserted into the host device 680 as shown in FIG. 6, among other embodiments disclosed herein.

Although the invention has been described with reference to specific embodiments, it will be understood by those skilled in the art that various changes may be made without departing from the spirit or scope of the invention. For example, to one of ordinary skill in the art, it will be readily apparent insertion portion 120 could be adjacent or coupled to side 363 (FIG. 3) instead of side 361 (FIG. 3). Additional examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. To one of ordinary skill in the art, it will be readily apparent that the case and method of use discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An adapter configured to couple a 34 millimeter ExpressCard to a 54 millimeter ExpressCard slot in a host device, the 34 millimeter ExpressCard having at least three sides, the 34 millimeter ExpressCard also having a data connector configured to coupled to an electrical connector of the host device, the adapter comprising:
   a first housing piece configured to be coupled to two or more sides of the at least three sides of the 34 millimeter ExpressCard when the adapter is coupled to the 34 millimeter ExpressCard; and
   a second housing piece coupled to the first housing piece and configured to couple to a first side of the at least three sides of the 34 millimeter ExpressCard when the adapter is coupled to the 34 millimeter ExpressCard, wherein:
   a portion of the second housing piece is configured to be located inside the 54 millimeter ExpressCard slot in the host device along with the 34 millimeter ExpressCard when the adapter is coupled to the 34 millimeter ExpressCard and a first portion of the 34 millimeter ExpressCard is located inside the 54 millimeter ExpressCard slot in the host device;
   when the adapter is coupled to the 34 millimeter ExpressCard and the portion of the second housing piece is located inside the 54 millimeter ExpressCard slot in the host device, the first housing piece is configured to be located outside of the 54 millimeter ExpressCard slot; and
   the first housing piece and the second housing piece are configured such that the data connector of the 34 millimeter ExpressCard directly couples to the electrical connector of the host device when the adapter is coupled to the 34 millimeter ExpressCard and the portion of the second housing piece is located inside the 54 millimeter ExpressCard slot in the host device.

2. The adapter of claim 1, wherein: the first side of the at least three sides of the 34 millimeter ExpressCard is one of the two or more sides of the at least three sides of the 34 millimeter ExpressCard.

3. The adapter of claim 1, wherein: the first side of the at least three sides of the 34 millimeter ExpressCard is different from the two or more sides of the at least three sides of the 34 millimeter ExpressCard.

4. The adapter of claim 1, wherein: the first housing piece is configured to circumscribe a portion of the 34 millimeter ExpressCard.

5. The adapter of claim 1, wherein: the first housing piece comprises a first connector configured to couple to a first connector of the 34 millimeter ExpressCard.

6. The adapter of claim 5, wherein: the second housing piece comprises a second connector configured to couple to the 34 millimeter ExpressCard.

7. The adapter of claim 1, wherein: the second housing piece is configured to couple to a groove at the first side of the at least three sides of the 34 millimeter ExpressCard.

8. The adapter of claim 1, wherein:
the first housing piece is configured to be decoupled from the second housing piece.

9. The adapter of claim 1, wherein:
the first housing piece and the second housing piece have a unitary structure.

10. The adapter of claim 1, wherein: the first housing piece is configured to be adjacent to four sides of the at least three sides of the 34 millimeter ExpressCard when the adapter is coupled to the 34 millimeter ExpressCard; and the four sides of the at least three sides of the 34 millimeter ExpressCard comprises the first side and the two or more sides.

11. An extender for a 34 millimeter ExpressCard and for use in a 54 millimeter ExpressCard slot, the 34 millimeter ExpressCard having two or more sides, a first side of the two or more sides of the 34 millimeter ExpressCard comprises an attachment mechanism, the extender comprising:
an insertion portion having a first attachment mechanism; and
a holding portion having at least two sides and coupled to the insertion portion, wherein:
the insertion portion is configured such that at least a part of the insertion portion can be located in the 54 millimeter ExpressCard slot along with the 34 millimeter ExpressCard when the extender is coupled to the 34 millimeter ExpressCard;
the first attachment mechanism of the insertion portion is configured to couple to the attachment mechanism of the 34 millimeter ExpressCard;
the holding portion is configured to be external to the 54 millimeter ExpressCard slot when the extender is coupled to the 34 millimeter ExpressCard and when the at least the part of the insertion portion and the 34 millimeter ExpressCard are located in the 54 millimeter ExpressCard slot;
a first side of the at least two sides of the holding portion is configured to adjoin the first side of the two or more sides of the 34 millimeter ExpressCard when the extender is coupled to the 34 millimeter ExpressCard;
a second side of the at least two sides of the holding portion is configured to adjoin a second side of the two or more sides of the 34 millimeter ExpressCard when the extender is coupled to the 34 millimeter ExpressCard; and
the insertion portion and the holding portion are devoid of any electrical elements.

12. The extender of claim 11, wherein:
the holding portion is configured to be detachable from the insertion portion.

13. The extender of claim 11, wherein:
the extender has a unitary structure.

14. The extender of claim 11, wherein:
the holding portion comprises a second attachment mechanism configured to couple to a third side of the two or more sides of the 34 millimeter ExpressCard;
the third side of the two or more sides of the 34 millimeter ExpressCard is adjacent to the second side of the two or more sides of the 34 millimeter ExpressCard and spaced apart from the first side of the 34 millimeter ExpressCard.

15. The extender of claim 11, wherein:
the insertion portion is configured such that when the extender is coupled to the 34 millimeter ExpressCard, the 34 millimeter ExpressCard and a part of the extender are capable of being inserted into an L-shaped ExpressCard slot; and
the 54 millimeter ExpressCard slot is the L-shaped ExpressCard slot.

16. The extender of claim 11, wherein:
a third side of the at least two sides of the holding portion is configured to adjoin a third side of the two or more sides of the 34 millimeter ExpressCard when the extender is coupled to the 34 millimeter ExpressCard;
the third side of the two or more sides of the 34 millimeter ExpressCard is adjacent to the second side of the two or more sides of the 34 millimeter ExpressCard and spaced apart from the first side of the 34 millimeter ExpressCard;
a fourth side of the at least two sides of the holding portion is configured to adjoin a fourth side of the two or more sides of the 34 millimeter ExpressCard when the extender is coupled to the 34 millimeter ExpressCard; and
the fourth side of the two or more sides of the 34 millimeter ExpressCard is adjacent to the first side and the third side of the two or more sides of the 34 millimeter ExpressCard and spaced apart from second side of the 34 millimeter ExpressCard.

17. The extender of claim 11, wherein:
the holding portion is configured to surround at least a portion of the 34 millimeter ExpressCard.

18. The extender of claim 11, wherein:
the 34 millimeter ExpressCard comprises a first portion and a second portion, the second portion is capable of being located in the 54 millimeter ExpressCard slot;
the holding portion and the insertion portion are configured such that the first portion of the 34 millimeter ExpressCard is located outside the 54 millimeter ExpressCard slot when the extender is coupled to the 34 millimeter ExpressCard and when the at least the part of the insertion portion and the second portion of the 34 millimeter ExpressCard are located in the 54 millimeter ExpressCard slot;
the holding portion is configured to couple to the first portion of the 34 millimeter ExpressCard; and
the insertion portion is configured to couple at least to the second portion of the 34 millimeter ExpressCard.

19. The extender of claim 18, wherein:
the second portion of the 34 millimeter ExpressCard has two or more outer surfaces; and
each of at least two surfaces of the insertion portion is configured to conform to one of the two or more outer surfaces of the second portion of the 34 millimeter ExpressCard.

20. The extender of claim 11, wherein:
the attachment mechanism of the 34 millimeter ExpressCard comprises two channels; and the first attachment mechanism of the insertion portion comprises two ridges.

21. A method of coupling a 34 millimeter ExpressCard to a 54 millimeter ExpressCard slot in a host device, the 34 millimeter ExpressCard having at least three sides, the 34 millimeter ExpressCard also having a data connector configured to coupled to an electrical connector of the host device the method comprising:

providing an adapter comprising: a first housing section; and a second housing section;

coupling the adapter to the 34 millimeter ExpressCard such that the first housing section is adjacent to two or more sides of the at least three sides of the 34 millimeter ExpressCard and the second housing section is adjacent to a first side of the at least three sides of the 34 millimeter ExpressCard; and inserting the 34 millimeter ExpressCard and a portion of the second housing section inside the 54 millimeter ExpressCard slot in the host device while the first housing section is exterior to the 54 millimeter ExpressCard slot in the host device such that the data connector of the 34 millimeter ExpressCard directly couples to the electrical connector of the host device.

22. The adapter of claim 1, wherein: the adapter is configured such that a second portion of the 34 millimeter ExpressCard is located outside of the 54 millimeter ExpressCard slot in the host device when the adapter is coupled to the 34 millimeter ExpressCard and the first portion of the 34 millimeter ExpressCard is located inside the 54 millimeter ExpressCard slot in the host device.

23. The adapter of claim 22, wherein: the first housing piece is configured to only couple to the second portion of the 34 millimeter ExpressCard.

24. The adapter of claim 1, wherein:
the first housing piece and the second housing piece consist of a first material and are devoid of any electrical elements.

25. The extender of claim 11, wherein:
a third side of the two or more sides of the 34 millimeter ExpressCard having a width and a height;
the width of the third side of the two or more sides of the 34 millimeter ExpressCard is greater than the height of the third side of the two or more sides of the 34 millimeter ExpressCard;
a width of the insertion portion is less than the width of the third side of the two or more sides of the 34 millimeter ExpressCard.

26. The extender of claim 11, wherein:
the 54 millimeter ExpressCard slot comprises an electrical connector;
the 34 millimeter ExpressCard comprises a data connector; and
the extender is configured such that the data connector of the 34 millimeter ExpressCard directly couples to the electrical connector of the 54 millimeter ExpressCard slot when the extender is coupled to the 34 millimeter ExpressCard and when the at least the part of the insertion portion and the 34 millimeter ExpressCard are located in the 54 millimeter ExpressCard slot.

* * * * *